United States Patent Office 3,003,314
Patented Oct. 10, 1961

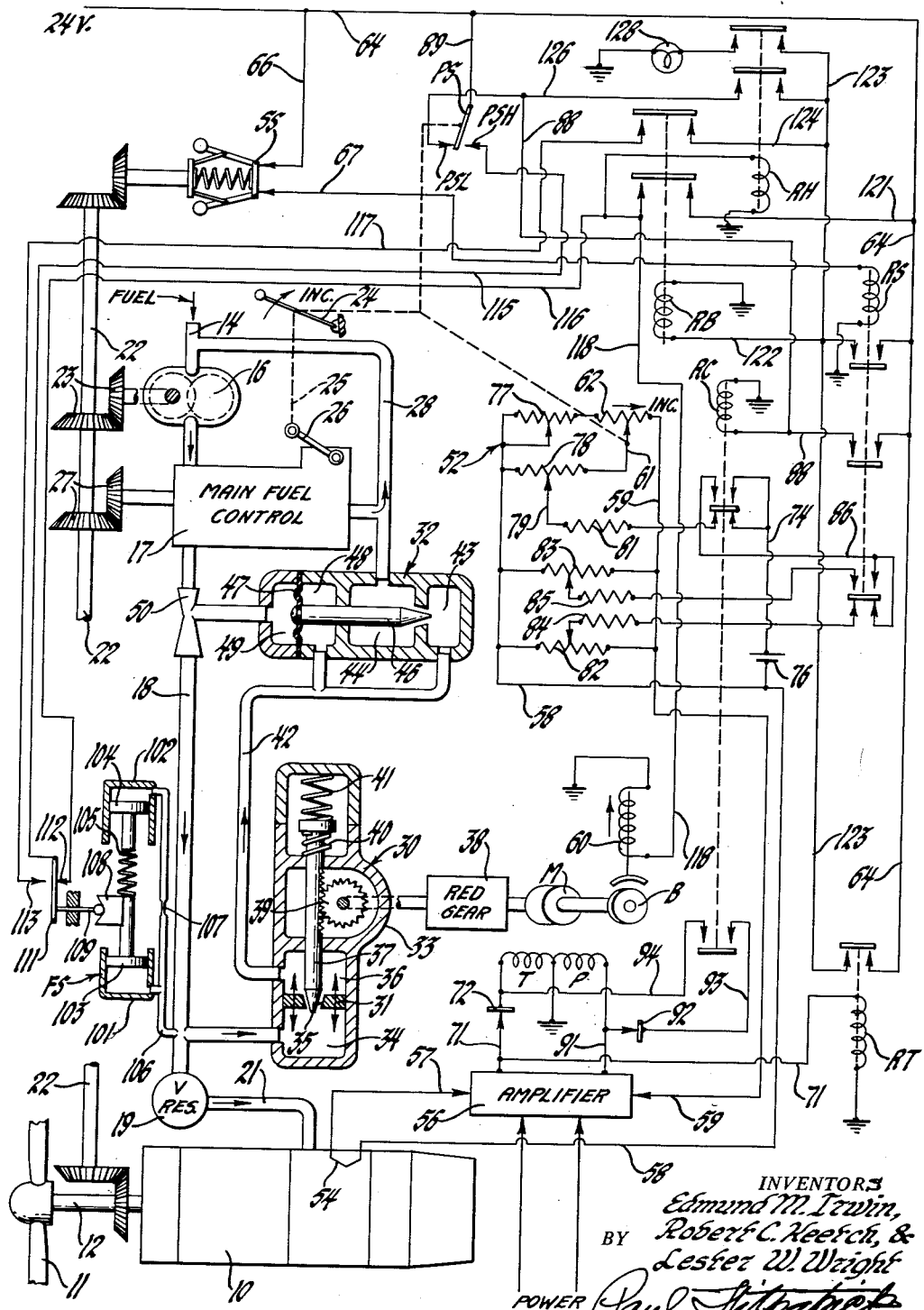

3,003,314
TEMPERATURE DATUM FUEL CONTROL
Edmund M. Irwin, Robert C. Keetch, and Lester W. Wright, Indianapolis, Ind., assignors to General Motors Corporation, Detroit, Mich., a corporation of Delaware
Filed Feb. 10, 1958, Ser. No. 714,129
8 Claims. (Cl. 60—39.28)

This invention is directed to fuel controls for aircraft gas turbines, particularly those driving propellers. More specifically, the invention is directed to an improvement in the fuel control described in U.S. Patent No. 2,938,340 of Boyer et al.

The control system of that patent may be described briefly. It provides for more accurate control of engine temperature and more accurate balancing of power of plural engines in an aircraft. It involves the combination with a main fuel control for a gas turbine of a temperature datum control responsive to temperature in the turbine and acting to correct the fuel flow metered by the main fuel control. The invention of the Boyer et al. patent is directed principally to controls which open or close the datum valve in response to turbine temperature, including means for operating the temperature datum control as a temperature limiter, only, under some conditions. It also includes means by which the temperature datum valve may be braked or locked in the particular position which it may occupy so that variation of fuel to the engine is controlled only by the main fuel control. However, when the datum valve is locked, the Boyer et al. system retains the temperature limiting control features, the datum valve brake being released in the event of engine overtemperature. These features of the previous temperature datum control are retained in the system of the present invention. The improvements in the present invention lie principally in an improved control for establishing the locked condition of the datum valve and for releasing the brake when overtemperature occurs. This is accomplished by improved control circuits and by the inclusion of an automatic control responsive to changes in the pressure of the fuel supplied to the engine for braking the datum valve.

In the system described in the patent, the datum valve is braked only by a manual operation by the pilot, specifically by closing a switch preparatory to a landing approach. In the system of this invention, the intervention by the pilot is unnecessary, since the same function is accomplished automatically. The present system locks the datum valve in response to any fuel flow transient of major amplitude such as results from a substantial change in power control lever setting. This has the advantage of eliminating conflict between the main and temperature datum fuel controls during transients. Those parts of the prior system which are retained in the system of this invention, and their mode of operation, are described in detail below.

The principal objects of the present invention are to improve the control of gas turbine engines and to provide a braking arrangement for a temperature datum control valve which operates automatically in response to conditions which call for operation of the brake. The nature of the invention and the advantages of it will be apparent to those skilled in the art from the succeeding detailed description of the preferred embodiments of the invention.

The accompanying drawing is a schematic diagram of the hydraulic and electric circuits of a fuel control system according to the invention.

Fuel circuits

Referring to the drawing, gas turbine engine 10 drives a variable pitch propeller 11 through shaft 12. Fuel from a suitable source is supplied to the engine through line 14, pump 16, main fuel control 17, line 18, resistance valve 19, and line 21. Pump 16 may be driven by the engine through auxiliary drive shaft 22 and gears 23.

The main fuel control 17 may be of any suitable known type adapted to meter fuel to the engine in accordance with ambient conditions, engine speed (or other control parameters) and power control lever setting. The control 17 may be, for example, a Bendix AP-B type control. An engine speed input is fed to the control by shaft 22 and gears 27. A power control lever 24 may transmit orders to the control 17, as by the schematically indicated transmission system 25, 26. The control 17 operates to provide the scheduled fuel supply to the engine by by-passing part of the discharge of pump 16 back to the pump inlet through line 28. The increasing power direction of movement of control lever 24 is indicated by an arrow.

To operate with the temperature datum control, the main control 17 is scheduled to pass an excess of fuel, preferably 20% above the calculated requirements. The metered output of the main control is adjusted or trimmed by the temperature datum control, which by-passes part of this output to the pump inlet.

If the datum control by-passes one-sixth of the main control output, the engine receives the assumed normal amount. Since the datum control may by-pass from zero to 58% of the fuel supplied by the main control, a wide range of fuel supply above and below the calculated normal is available.

The temperature datum control includes a motor-operated bypass valve 30 and a regulating valve 32. The bypass valve may be opened or closed to by-pass more or less than one-sixth of the metered fuel. The regulating valve 32 maintains a pressure drop across the bypass valve proportional to the square of total flow so that the percentage of fuel by-passed is proportional to bypass valve opening and is independent of variations in the amount of fuel metered.

The bypass valve 30 comprises a body 33 defining chambers 34 and 36 separated by a wall 31 having an orifice 35 varied by the contoured end of a plunger 37 reciprocable in the body. Plunger 37 is moved in either direction from a null (partially open) position by a motor armature M working through reduction gear 38 and rack-and-pinion drive 39. The null position is defined by springs, represented by coil springs 40 and 41, which bias the plunger toward this position from either extreme of movement. Wall 31 is adjustable longitudinally of the plunger by any suitable means to vary the opening in the null position of the plunger and thereby the proportion of fuel by-passed in the null position.

Chamber 34 is connected to engine supply line 18, and chamber 36 to the pump inlet through line 42, valve 32, and bypass line 28.

Valve 32 is a diaphragm-controlled throttling valve. Line 42 enters chamber 43, and line 28 discharges from chamber 44. These are connected by a port varied by the contoured end of plunger 46 reciprocable in the valve body under control of a diaphragm 47. The valve plunger is urged to open by pressure in chamber 48 connected to the line 42 and is urged to close by pressure in chamber 49, both pressures acting on diaphragm 47. Chamber 49 is connected to the throat of a Venturi 50 in line 18.

As will be apparent, the difference between the pressures in chambers 34 and 49 is the loss in static head in the Venturi throat, which is proportional to the square of flow through the Venturi.

The pressures in chambers 36 and 43 are equal by virtue of the connection through line 42. The pressures in chambers 48 and 49 are equal because of the flexible diaphragm 47 between them. Therefore, the drop in pressure from chamber 34 to chamber 36 is proportional to the square of flow in line 18. Therefore, the flow through variable orifice 35, for any given opening, is proportional to flow in line 18.

As stated, in the null position of plunger 37, one-sixth of the flow is by-passed, leaving 100% of the computed amount to proceed to the engine.

The resistance or pressurizing valve 19 maintains a pressure drop of about 50 pounds per square inch to ensure sufficient working pressure in the control under engine conditions such that the pressure in line 21 leading to the engine fuel nozzles is very low.

Datum valve operation

The position of valve plunger 37 is determined ordinarily by the relation of engine temperature to the scheduled values. This is effected by a followup or servo system including a temperature scheduling potentiometer group 52, thermocouples 54 responding to turbine inlet temperature, a followup control electronic amplifier 56, and motor armature M operated by coils T and P energized by the amplifier 56. Preferably a number of thermocouples are distributed around the turbine annulus. These are represented schematically in the figure.

It will be understood that the details of the amplifier or motor control and of the motor are matters of servomechanism technique immaterial to the present invention. The amplifier may be a Bendix type ET-A amplifier.

The motor control is represented diagrammatically herein in the interest of concise exposition of the invention. This control may be as described or any suitable analogous system. For the present, it will be understood that thermocouples 54 generate a potential proportional to turbine inlet temperature. Potentiometer system 52 provides a potential indicative of desired turbine inlet temperature. These are connected in opposing series to provide an input to the amplifier by a circuit through line 57, thermocouples 54, line 58, potentiometer group 52, and line 59.

The motor M, T, P may be of any suitable type. It is illustrated here, by way of example, as being a D.C. torque motor having two field coils energized respectively for operation in opposite directions. The T or "take" coil operates the motor in the direction to by-pass more fuel; the P or "put" coil drives the valve toward closed position to by-pass less fuel and thus put more into the engine. Armature M is also coupled to a brake B which is normally engaged and is released by energization of a solenoid 60. In normal operation, the amplifier may drive the motor in either direction. Greater energization of coil T than coil P takes fuel, and vice versa.

Motor M, T, P, valves 19, 30 and 32, and venturi 50 may be elements of a Bendix type PB-A2 temperature datum valve.

The fuel circuits and valve control so far described are the same as those of the Boyer et al. patent.

Datum valve control system

Under certain conditions, it is desirable to use the motor only for temperature limiting control; that is, to take fuel if engine temperature is excessive. It is also desirable at times to brake the motor to prevent fuel adjustment by the datum control. However, the braking or disabling of the datum control remains effective only so long as no dangerous overtemperature occurs. We may now consider the control circuits which make these desirable control features possible.

The mode of operation of the datum control system is governed by four factors: (1) the setting of power control lever 24; (2) engine speed; (3) rate of change of engine fuel pressure; and (4) the relation of engine temperature to the scheduled value.

The power control lever 24 is coupled mechanically to switch PS which remains closed on one contact at low power settings and closes on another contact when the power control moves from the low power range used for starting, taxiing, and landing into the higher power range used for flight. Specifically, in the example illustrated, movable contact PS is closed on contact PSL below the 65° position of the power lever and on contact PSH above the 65° position. This position of the power lever is below the cruise range used in normal flight and above the low power settings used in the landing approach, which may go down to a flight idle position at about 35°. Thus, when the engine is being started and the airplane is being taxied, or when power is reduced for the landing approach, contact PSL is engaged. During takeoff and normal cruising flight, contact PSH is engaged.

Control lever 24 is also coupled mechanically to movable contact 61 of a temperature scheduling potentiometer 62 by which engine temperature is varied from a relatively low value at low power settings in the flight range to the maximum allowable value at maximum power settings.

Engine speed reacts on the datum control system through a speed-responsive switch device SS driven from the auxiliary shaft 22. Swith SS remains closed until the engine speed reaches a value about 94% of rated value, below the operating speed of the engine in flight. Switch SS energizes a speed relay RS from the 24 volt D.C. control bus 64 through line 66, switch SS, line 67, and the coil of relay RS to ground.

As previously stated, amplifier 56 develops an output signal based upon the difference between engine temperature sensed by thermocouples 54 and the temperature signal transmitted by potentiometer group 52. Overtemperature creates a potential in line 71 which leads to "take" coil T through rectifier 72 and to overtemperature relay coil RT.

The interaction of power lever position, engine speed, overtemperature, and rate of change of fuel pressure on the operation of the system is rather complex, and will be discussed after a description of the normal fuel regulating control operation.

Consider now the operation of the potentiometer circuit 52 which develops the reference voltage which acts in opposition to the temperature signal generated by the thermocouples 54 to control, through the amplifier, the operation of the temperature datum valve 30. The potentiometer group 52 is connected between the thermocouples and the amplifier by lines 58 and 59, respectively, which constitute two buses of the potentiometer group. Line 58 is connected to one terminal of an accurate source of fixed reference voltage which may, in practice, be derived from the power pack of the amplifier, but which is represented schematically by the battery 76. The other terminal of battery 76 is connected in normal operation through line 74, a back contact of a cutout relay RC, and a resistance 81 to the variable tap 79 of potentiometer 78. Potentiometer 78 is connected between bus 58 and the variable tap 61 of the temperature control potentiometer 62. Potentiometer 62 is connected to bus 59 and through variable resistance 77 to bus 58. The potential difference between lines 59 and 58 will be determined by the settings of the potentiometers 77, 78 and 62. The fixed potential from the source 76 is divided by the resistor 81 and the portion of potentiometer 78 between slider 79 and bus 58. The potential between slider 79 and bus 58 is also divided by the other portion of potentiometer 73 and the portions of potentiometers 62 and 77 in the circuit through these potentiometers to bus 58. The potential of the slider 61 is applied to line 59 without any significant drop, since there is no significant current flow in line 59 which acts as the amplifier input.

By varying the position of slider 79, which determines the current through slider 61, the left portion of potentiometer 62, and potentiometer 77, the slope characteristic of potentiometer 62, that is, the relation between displacement of slider 61 and potential (which determines engine temperature) is adjusted. Varying the position of the slider on potentiometer 77 varies the potential drop in this potentiometer which adds to the drop in potentiometer 62 and thus serves as a range adjustment by increasing the ordinates of the curve of potential against displacement of the potentiometer 62.

In summary, potentiometer 62 transmits the desired temperature to the amplifier and potentiometers 77 and 78 serve respectively to vary the datum point and the slope of the output line of potentiometer 62.

If the potential taken off the potentiometer group equals that generated by the thermocouples, the amplifier input on lines 57 and 59 will be zero, since these are connected in opposition. An excess or deficiency of engine temperature is reflected by higher or lower potential, respectively, on line 57 than on line 59. Excessive temperature results in energization of the T coil to open the bypass 35 and decrease fuel flow to the engine. Deficiency in temperature results in energization of the P coil which drives the motor to close the bypass and put more fuel into the engine. Under normal flight conditions the scheduled engine temperature increases from a minimum value at low power settings to a maximum value at maximum power settings. The slider 61 thus moves to the right to increase potential as the power setting is increased in the flight range.

The potentiometer group 52 also includes potentiometers 82 and 83 connected between busses 58 and 59 which may be set or adjusted to transmit desired temperature signals independently of slider 61. These potentiometers normally control when starting the engine and in the taxi range and the lower range of the flight power settings. Throughout this range of operation the pilot switch PS is closed on contact PSL, which opens at about 65° travel of the control lever 24, at which point normal temperature datum control is initiated. Potentiometer 82 is set to the maximum limiting temperature for normal engine operation, corresponding to the maximum signal which can be derived from the potentiometer 62 at the maximum power position of lever 24. Potentiometer 83 is set at a considerably lower degree of temperature to protect the engine during starting. This temperature, however, may be greater than the minimum operating temperature available from potentiometer 62. The sliders of potentiometers 82 and 83 are connected through resistors 84 and 85, respectively, to back and front contacts, respectively, of speed relay RS which connects one or the other of these to a lead 86 running to a front contact of cutout relay RC. Relay RS is energized by speed switch SS when the engine is below 94% of rated speed. It will be apparent, therefore, that potentiometer 83 is active in starting the engine. However, in normal operation, including taxiing, the engine speed is above 94% so that potentiometer 82 is connected to line 86.

Cutout relay RC connects either line 86 and thus potentiometer 82 or 83, or resistor 81 and thus slider 61, to the fixed potential line 74. The coil of cutout relay RC is energized through a front contact of speed relay RS and line 88 whenever engine speed is below the normal operating range so that, when starting, the potentiometer 83 is in control.

Cutout relay RC is also energized from bus 64 through line 89, switch PS, contact PSL, and line 88 as long as the control lever is in the starting, taxiing, and landing range; thus, the engine starts under control of potentiometer 83, is switched over to potentiometer 82 by the speed relay RS at 94% rated speed, and remains there until the control lever 24 is advanced into the takeoff and normal flight range, at which time the circuit through switch PS and the coil of RC is also broken to complete the circuit from potentiometer 62 to the amplifier.

Temperature limiting control

The cutout feature of the invention; that is, the feature involving disabling of the "put" circuits of the datum control so that the control acts only to limit temperature and will not increase it, is also employed during starting. The main fuel control 17 of the engine is particularly adapted to schedule fuel to the engine when it is starting so as to avoid surge. If the datum control were allowed to override the main fuel control and supply additional fuel to the engine because its temperature has not reached a normal operating value, unsatisfactory starting would result. The mechanism by which the "put" circuits may be disabled is shown schematically. The "put" output line 91 of the amplifier is connected through a rectifier 92, lead 93, a front contact of cutout relay RC, and lead 94 to the "take" coil T. When the contact is closed overtemperature signals in line 71 can flow into the T coil through rectifier 72 and to ground. These signals cannot enter the P coil because they are blocked by rectifier 92. Therefore, the motor functions normally to open valve 30 in the event of overtemperature. However, if temperature sensed by the thermocouples is below that called for by the potentiometer group, amplifier output on line 91 flows in two parallel circuits to ground; one directly through the P coil, the other through rectifier 92, line 93, front contact of RC, line 94, and the T coil. These coils are thus energized concurrently, and the result is balanced excitation so that the motor does not move off its null position in response to an undertemperature signal. Cutout relay RC is energized to close its front contacts, as previously stated, by switch SS and speed relay RS when engine speed is below 94% rated and by switch PS when the power setting is below the take-off and flight cruise range.

Temperature datum lockout

Another phase or mode of operation of the control arises in landing. It has been found desirable to eliminate the regulating action of the temperature datum control when the airplane is coming in for a landing with power setting at flight idle (substantially zero power output). It is not desirable, however, merely to cut out and disable the datum control altogether, as this allows the bypass valve 32 to return to its null position. Assuming that the engine has been operating on a fuel that resulted in the datum valve being driven to modify substantially the metered output of the fuel control, the fuel supply to the engine would be considerably disturbed and most of the advantages of the datum control would be lost if it were merely deenergized and allowed to go to its null position. However, for example, if the datum control has been withdrawing 10% of the metered fuel in flight, it may be desirable to continue to withdraw this portion of fuel as the plane lands. This way the main fuel control 17 regulates the changes of fuel rate of the engine as it encounters the rapid changes in ambient conditions as it lands. The main control is better adapted to maintain the engine in a constant low power mode of operation than the temperature datum control, but it is benefited if the correction for fuel characteristics set by the datum control is maintained.

In order to lock into the datum control the particular percentage value of bypass under which it is operating, brake coil 60 is deenergized, whereupon the brake 60 is applied by a spring or the like (not illustrated).

As previously mentioned, in the system of the Boyer et al. application, the brake was applied by actuation of a switch by the pilot at a time when engine operation was stabilized prior to the landing approach. The system of this invention eliminates the pilot-operated switch and the control difficulties that may arise from failure of the pilot to remember to operate the switch, or by operation of the switch at a time when the engine operation is not stable, that is, when the engine fuel supply is changing. These results are effected principally by a fuel pressure rate switch FS, a holding relay RH, the power lever switch PS, and modified circuits through the contacts of the brake relay RB, which will now be described.

The fuel switch FS, which is shown diagrammatically, may be a device such as that described in the abandoned application of Robert C. Keetch for "Pressure Change Responsive Device," Serial No. 629,633, filed December 20, 1956. The schematic showing of this device on the drawing is sufficient for an understanding of its nature and its relation to the system. The fuel switch FS comprises opposed cylinders 101 and 102 within which are mounted pistons 103 and 104, the rods of which are coupled by a compression spring 105. Pressure of the fuel in the engine fuel supply line at any convenient point downstream of the main fuel control, such as line 18, is supplied to cylinder 101 through a pressure conduit 106 and to cylinder 102 through a branch conduit having a restriction 107. A V-shaped cam 108 reciprocated by piston rod 103 operates a reciprocable cam follower 109 which operates the center contact 111 of a single pole double throw switch. When the follower is centered in the notch of the cam, contact 111 engages front contact 112. If piston 103 moves appreciably in either direction, contact 111 is moved to engage back contact 113.

The fuel switch FS opens contacts 111, 112 and closes contacts 111, 113 whenever the pressure of the fuel is changing at a rate greater than a predetermined value. Changes in the pressure of the fuel are communicated immediately to piston 103, but slowly to piston 104 because of the restriction 107. Thus, any rapid change of fuel pressure causes a rapid movement of piston 103, moving cam 108 off center and compressing or relaxing spring 105. The slower response of piston 104 ultimately rebalances the two pistons, allowing the cam to return to neutral. The center contact 111, front contact 112, and back contact 113 of fuel switch FS are connected, respectively, to leads 115, 116, and 117. The fuel switch is calibrated so as to respond to sharp transients arising from substantial movement of the power lever 24, but not to gradual changes due to varying ambient conditions.

As previously stated, the movable contact of power lever switch PS is connected to the bus 64 through lead 89. The low power contact PSL is connected through lead 88 to the cutout relay RC. The high power contact PSH is connected to lead 115. Lead 116 is connected to the coil of holding relay RH and through a branch lead 118 and brake coil 60 to ground. It will be seen, therefore, that when contact PSH is energized and fuel pressure is stable, the brake will be energized and thereby released through lead 89, contact PSH, lead 115, switch FS, and leads 116 and 118. Brake release line 118 may also be energized from bus 64 through a branch line 121 and front contacts of brake release relay RB. Brake release relay RB is energized from bus 64 through front contacts of speed relay RS and lead 122 whenever engine speed is below 94% rated. It will be understood that engine speed is at 100% rated during all normal operation of the engine.

Relay RB may also be energized to release the brake by an over-temperature relay RT. This relay is energized by a branch of amplifier output lead 71. Lead 71 is energized whenever the temperature is in excess of the limit set by the potentiometer group 52 and cutout relay RC. Thus, if the engine temperature is in excess and therefore hazardous to the engine, relay RT will be energized. When energized, front contacts of relay RT close a circuit from bus 64 through leads 123 and 122 to the coil of brake release relay RB.

Lead 123 may also be energized through lead 89, contact PSH, lead 115, the back contact 113 of fuel switch FS, lead 117, a front contact of relay RB, and a branch line 124 when relay RB has been energized. This circuit provides a holding circuit for the brake release relay, once it has been energized by the overtemperature relay, which holds it energized until the fuel flow has stabilized.

Holding relay RH, which is energized whenever the brake is energized (released), has two sets of front contacts. One set connects line 123 to line 88 through a branch line 126. The other set connects line 123 through a signal light 128 visible to the pilot to ground.

The purpose of these switches and relay circuits will be more clearly apparent from the succeeding résumé of the operation of the temperature datum lock-out, which may begin with the starting of the engine. When the engine is started, power lever switch PS is closed on contact PSL to energize cutout relay RC through lead 88. The fuel switch lead 115 is deenergized at PSH. Speed switch SS energizes speed relay RS which energizes brake relay RB to hold the brake released. Relay RB energizes holding relay RH through leads 121 and 116. The front contacts of the holding relay complete the circuit from contact PSL through leads 126, 123 and 122 to hold the brake relay energized after speed reaches the normal value and the speed relay is deenergized. The warning light 128 is energized from lead 123. It will be seen, therefore, that the brake remains released. The airplane may then be taxied, ordinarily with the power lever below 65°. When the fuel control lever is advanced for takeoff, as it passes the 65° position, contact PSL is deenergized. This denergizes the cutout relay energized through lead 88. It also deenergizes the holding circuit for the brake relay RB through lines 126, 123, and 122. The energizing circuit of relay RH through line 121 and contacts of relay RB is thus opened and the warning light 128 is extinguished.

The increase in fuel flow due to advancing the power lever will cause fuel switch FS to close its back contacts before switch PS closes on its contact PSH. When contact PSH is energized, a circuit is completed from this contact through line 115, the back contacts of FS and line 117. However, since the brake relay RB is deenergized, this circuit terminates at line 117. The brake, therefore, remains deenergized and applied until the fuel transient ends and switch FS closes on its front contact. This energizes lead 116 connected directly through lead 118 to the brake coil and releases the brake. Relay RH is also energized but, since lead 123 is not energized, the warning light 128 does no go on.

If the power lever is further advanced to the takeoff power rating, the fuel switch will again deenergize the brake until the transient has passed. Also, during flight, any sharp movement of the power control will temporarily apply the brake.

Now, assume the pilot is preparing for a landing; the engine is operating in a stable condition, and the temperature datum valve is holding the engine to the desired temperature. When the pilot pulls his throttle back for the landing approach, the initial movement will cause the fuel switch to deenergize lead 116, thus applying the brake. This also deenergizes holding relay RH. The fuel switch response energizes line 117. When the power control lever passes the 65° position, the energizing circuit through lead 115 is opened. The brake will normally remain applied during the landing approach. Only if the engine goes over temperature will the brake be released. The cut-out relay RC is energized below the 65° position so that the datum control responds only to the maximum temperature limit established by potentiometer 82. If this limit is exceeded, temperature relay RT will be energized, energizing by the circuits previously described brake relay RB and holding relay RH. Warning light 128 will be energized by relay RH to signal the pilot that the established bypass ratio has been lost in response to the overtemperature. Holding relay RH also holds the brake relay energized after the overtemperature has been corrected through lead 89, switch PS and leads 126, 123, and 122.

If the pilot wishes to re-establish the temperature datum lock-out, he may do so by advancing the throttle above the 65° position, allowing the fuel flow to stabilize, and then again pulling back the throttle to the low level for landing.

In summary, it will be seen that the temperature datum brake system puts on the brake temporarily in response to any fuel transient when the power lever is above the 65° position. It also holds the brake on when the lever is below 65°. In either event, the brake will be released if excessive temperature occurs. If the brake is released by overtemperature in the high power range, it may re-engage, although only until the fuel transient is over. If it is released in the low power range, it will remain released until the pilot has taken steps to re-stabilize the engine fuel control above the 65° point.

It will be apparent that the improved system of this invention is highly advantageous. It relieves the pilot of the necessity of operating a special control to lock the datum control for landing. It prevents the brake from going on unless the engine is in a stable condition of operation. It locks the datum control against variation during changes in engine power level, leaving these changes to the main fuel control and thus preventing any conflict between the main fuel control and the temperature datum control. After the main control has completed the change in fuel rate attendant upon a change in power demand, the datum control is released and may make any necessary adjustments to bring the turbine temperature to the desired value. The brake, however, is released in any case so as to protect the engine in the event of a rise in temperature above a safe level.

The fuel switch shown is merely one example of numerous means which might be adopted to respond to transients in engine performance. This switch employs changes in fuel flow as a means for sensing transients in the engine. This is believed to be the best way to sense such transients for the purposes of this invention. The fuel switch responds indirectly to transients in power lever position. It responds directly to transients in fuel flow which are indicative of the resulting transients in engine temperature. Various other means responsive to such transients might be employed for the datum valve brake control.

The detailed description of preferred embodiments of the invention for the purpose of explaining the principles thereof is not to be construed as limiting the invention, as many modifications may be made by the exercise of skill in the art within the principles of the invention.

What is claimed is:

1. A fuel system for a gas turbine engine comprising, in combination, a fuel control adapted to meter fuel to the engine in accordance with power requirements and engine characteristics, a temperature datum control capable of modifying the output of the fuel control, means responsive to engine temperature, means establishing a scheduled temperature, power means actuated by the aforementioned means coupled to the datum control to vary the output thereof, means for locking the datum control at any point in the range thereof, and means actuated as a function of the rate of change of a condition indicative of engine operating conditions coupled to the locking means for actuation thereof during transients in the said condition.

2. A fuel system for a gas turbine engine comprising, in combination, a fuel control adapted to meter fuel to the engine in accordance with power requirements and engine characteristics, a temperature datum control capable of modifying the output of the fuel control, means responsive to engine temperature, means establishing a scheduled temperature, power means actuated by the aforementioned means coupled to the datum control to vary the output thereof, means for locking the datum control at any point in the range thereof, a power lever controlling the fuel control, and means actuated as a function of the rate of change of a condition indicative of power lever position coupled to the locking means for actuation thereof during transients in the said condition.

3. A fuel system for a gas turbine engine comprising, in combination, a fuel control adapted to meter fuel to the engine in accordance with power requiremnts and engine characteristics, a temperature datum control capable of modifying the output of the fuel control, means responsive to engine temperature, means establishing a scheduled temperature, power means actuated by the aforementioned means coupled to the datum control to vary the output thereof, means for locking the datum control at any point in the range thereof, a power lever controlling the fuel control, means sensitive to a transient condition indicative of alteration of power lever position coupled to the locking means for actuation thereof during the transient condition, and means for holding the locking means actuated responsive to movement of the power lever below a predetermined position.

4. A fuel system for a gas turbine engine comprising, in combination, a fuel control adapted to meter fuel to the engine in accordance with power requirements and engine characteristics, a temperature datum control capable of modifying the output of the fuel control, means responsive to engine temperature, means establishing a scheduled temperature, power means actuated by the aforementioned means coupled to the datum control to vary the output thereof, means for locking the datum control at any point in the range thereof, a power lever controlling the fuel control, means sensitive to a transient condition indicative of alteration of fuel supply to the engine coupled to the locking means for actuation thereof during the transient condition, and means for holding the locking means actuated responsive to movement of the power lever below the normal power level range.

5. A fuel system for a gas turbine engine comprising, in combination, a fuel control adapted to meter fuel to the engine in accordance with power requirements and engine characteristics, a temperature datum control capable of modifying the output of the fuel control, means responsive to engine temperature, means establishing a scheduled temperature, power means actuated by the aforementioned means coupled to the datum control to vary the output thereof, means for locking the datum control at any point in the range thereof, and means actuated as a function of the rate of change of fuel supply to the engine coupled to the locking means for actuation thereof during transients in fuel supply.

6. A control for a gas turbine engine comprising, in combination, fuel control means, movable means responsive to a condition of engine operation connected to the fuel control means for modifying the fuel output thereof in response to said condition, sensitive means actuated as a function of the rate of change of a condition indicative of engine operating conditions, locking means connected to the movable means adapted to hold the movable means in its position of adjustment, and means actuated by the sensitive means coupled to the locking means for actuation thereof.

7. A control as recited in claim 12 including means responsive to a predetermined excessive value of the first-mentioned condition of engine operation coupled to the locking means operable to release the locking means upon the occurrence of the said excessive value.

8. A control for a gas turbine engine comprising, in combination, fuel control means, movable means responsive to a condition of engine operation connected to the fuel control means for modifying the fuel output thereof in response to said condition, sensitive means actuated as a function of the rate of change of engine fuel supply, locking means connected to the movable means adapted to hold the movable means in its position of adjustment, and means actuated by the sensitive means coupled to the locking means for actuation thereof.

References Cited in the file of this patent

UNITED STATES PATENTS

| | | |
|---|---|---|
| 2,862,355 | Davis et al. | Dec. 2, 1958 |
| 2,867,084 | Criswell | Jan. 6, 1959 |
| 2,892,307 | Mangan et al. | June 30, 1959 |
| 2,938,340 | Boyer et al. | May 31, 1960 |
| 2,942,418 | Thorpe et al. | June 28, 1960 |

UNITED STATES PATENT OFFICE

CERTIFICATION OF CORRECTION

Patent No. 3,003,314            October 10, 1961

Edmund M. Irwin et al.

It is hereby certified that error appears in the above numbered patent requiring correction and that the said Letters Patent should read as corrected below.

Column 8, line 42, for "denergizes" read -- deenergizes --; column 10, line 21, for "requiremnts" read -- requirements --; line 75, for the claim reference numeral "12" read -- 6 --.

Signed and sealed this 3rd day of April 1962.

(SEAL)
Attest:

ERNEST W. SWIDER            DAVID L. LADD
Attesting Officer            Commissioner of Patents